P. MACGAHAN.
DISTRIBUTING SYSTEM.
APPLICATION FILED DEC. 10, 1914.
1,329,193. Patented Jan. 27, 1920.
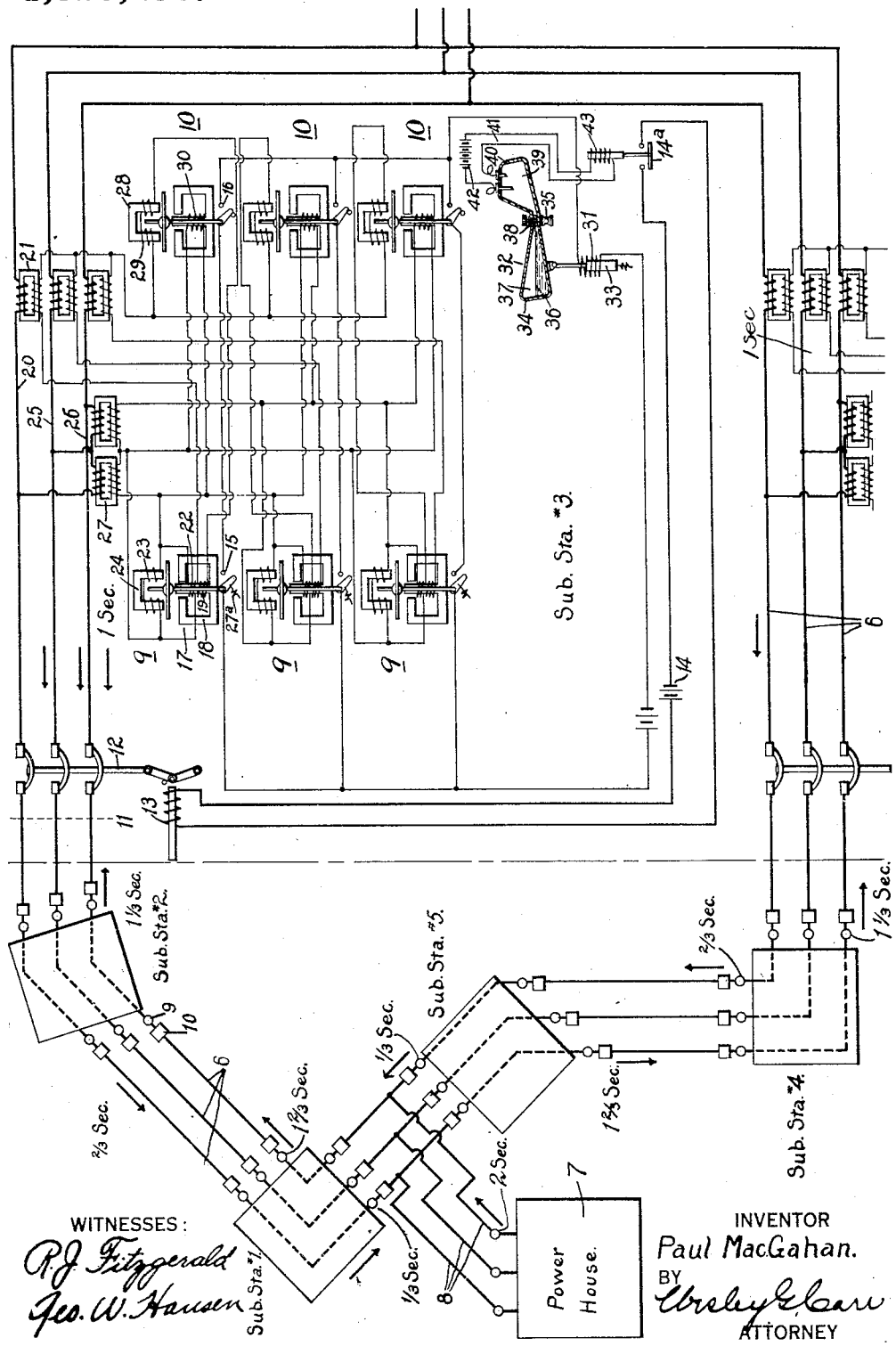
WITNESSES:
P. J. Fitzgerald
Geo. W. Hansen
INVENTOR
Paul MacGahan.
BY
Wesley L. Carr
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

DISTRIBUTING SYSTEM.

1,329,193.         Specification of Letters Patent.      Patented Jan. 27, 1920.

Application filed December 10, 1914. Serial No. 876,461.

*To all whom it may concern:*

Be it known that I, PAUL MACGAHAN, a citizen of the United States, and a resident of Pittsburgh, in the county of Allegheny and State of Pennsylvania, have invented a new and useful Improvement in Distributing Systems, of which the following is a specification.

My invention relates to a system of electrical power distribution, and it has special reference to such a system in which the various sub-stations are interconnected in the well-known "ring" formation, the same being supplied through feeders that deliver power from a generating station.

More particularly, my invention relates to a distributing system of the above-mentioned character in which any one disabled section of the transmission line interconnecting the various sub-stations and the main generating station may be cut out of service without interrupting the power supply to any sub-station of the system.

In the past, it has been usual to connect each sub-station to the main generating station by one or more direct feeders, or to supply a number of separate feeders to one or more important points on the distributing feeder net-work so as to admit of a faulty feeder being cut out of service without interrupting the supply of energy. Such a feeder net-work may be laid out in various ways, but the different arrangements which are commonly used may be considered as belonging to one or the other of the two following systems, or a combination of them, for instance: (1), a system wherein one or more feeders extend directly between a generating station and each sub-station, or between the generating station and the several sub-stations connected in series relationship, and (2), a system wherein the sub-stations are separately connected by single feeders to the generating station, the sub-stations being connected together in a ring formation by means of interconnectors or tie lines. In the first-mentioned system, protection is usually insured by means of overload inverse-time limit circuit breakers that are inserted at the generating station end and reverse-power circuit breakers that are inserted at the substation end of the feeders. However, it is obvious that this system of protection is not applicable to the second system mentioned above, or the ring-type system, as power may flow from one sub-station to another substation, the direction of flow of power in the interconnecting feeders altering according to the relative loading of the sub-stations.

As long as the interconnecting feeders between the sub-stations are in good condition and are not permanently overloaded so as to be burned, overloads and shorts on the distributing net-work should never cut the interconnectors between sub-stations out of circuit. When an interconnector of a ring-type system of distribution becomes grounded or shorted, it is obvious that protective means must be employed to disconnect the affected interconnector from circuit, and, at the same time, to insure a continuous supply of power to all of the sub-stations. Moreover, the protective means should discriminate between shorts or grounds occurring in the interconnectors themselves and in other parts of the distributing net-work. The protective system disclosed in British patent No. 3896 of 1904 to Merz & Price and entitled "Protecting apparatus on alternating current systems," has been found commercially successful for protecting ring type systems of distribution, but it embodies pilot wire connections between the sub-stations and differential balance relays, and is, accordingly, unduly expensive.

An object of my invention is to provide protective means for a ring-type system of power distribution whereby any one disabled section of the transmission line may be automatically cut out without interfering with the supply of power to all the sub-stations comprising the system. At the same time, I obviate the necessity of employing expensive pilot wire connections between the various sub-stations and unreliable and difficultly adjustable differential balance relays.

For a better understanding of the nature and scope of my invention, reference may be had to the following description and to the drawing the single figure of which is a diagrammatic view of a ring-type system of power distribution embodying a form of my invention. While a single main generating station is shown as supplying power to five sub-stations that are connected in a ring-type formation by interconnectors or tie lines, it is obvious that many distributing feeders (not shown) may extend from each sub-station in order to supply energy to the area assigned to the sub-stations.

Referring to the drawing, sub-stations 1, 2, 3, 4 and 5 are connected in a ring-type formation by means of interconnectors or auxiliary feeders 6 which are shown as three-phase transmission lines. A three-phase power-generating station 7, which may be any one of the usual and well-known types, supplies power to the ring formation by means of main feeders 8 that are shown connected to the interconnectors 6 at an intermediate point between sub-stations 1 and 5. For convenience, the protective devices associated with the sub-stations 1, 2, 4 and 5 are indicated on the drawing by means of symbols, such as circles 9 and squares 10, the devices which these symbols represent being fully illustrated in connection with the sub-station 3.

For the present, assume that each circle 9 represents an overload relay with a definite time element for overload time-limit conditions, the time element being usually expressed in seconds or fractional parts thereof. The time settings in seconds for each group of relays 9 inserted in the interconnectors 6 on each side of each substation, are indicated by the figures adjacent to the respective groups; for instance, the time settings for the overload relays 9 associated with the sub-station 1 are one-third of a second and $1\frac{2}{3}$ seconds, respectively. Again, assume that each square represents a reverse-energy or watt relay. It will be noted that each overload relay 9, which has a definite time element, as indicated by the time element affixed to it, is associated with a reverse energy or watt relay 10. The relays 10 are so arranged that they permit the relays 9 to function only when the direction of flow of energy is away from the respective substations. That is, the interconnectors cannot be disconnected unless energy is flowing into the same from the substations at the respective ends thereof.

The time elements of the relays 9, which are correspondingly placed with respect to each sub-station, are so arranged that they vary from one another by equal time increments; in this instance, one-third of a second. To illustrate, the definite time element for the relays 9 associated with the sub-station 1, and on the side thereof remote from the power house 7, is indicated as $1\frac{2}{3}$ seconds. The time elements of the correspondingly placed relays 9 of the sub-stations 2, 3, 4 and 5 are successively indicated as $1\frac{1}{3}$ seconds, one second, $\frac{2}{3}$ of a second, and $\frac{1}{3}$ of a second, respectively, when advancing around the ring formation in a clockwise direction. Again, the time element for the relays 9 associated with the sub-station 5 and on the side thereof remote from the power house 7, is indicated as $1\frac{2}{3}$ seconds. The time elements of the correspondingly placed relays 9 for the sub-stations 4, 3, 2 and 1 are successively indicated at $1\frac{1}{3}$ seconds, one second, $\frac{2}{3}$ of a second and $\frac{1}{3}$ of a second, when advancing around the ring formation in a counter-clockwise direction. From the above, it is obvious that, if a short circuit occurs on any one interconnector between adjacent substations, the affected interconnector will be cut out of circuit by reason of the successive operation of the relays 9 and 10 which are disposed at the respective ends of the same. At the same time, all of the substations are assured of being supplied with power from the generating station 7. If a short circuit occurs at the point 11 on the interconnector 6 between substations 2 and 3, the protective devices 9 and 10, inserted in the affected interconnector and adjacent to the substations 3 and 2, will operate in one and $1\frac{1}{3}$ seconds, respectively, to disconnect the interconnector from the circuit if power flows toward the point 11 from the substations 2 and 3. As explained above, the relays 10 will function properly to permit the relays 9 to function after the expiration of definite intervals of time because the energy flows from the substations 2 and 3 into the interconnector. That is, the relay 10 adjacent the substation 2 is normally so actuated that its corresponding relay 9 may function $1\frac{1}{3}$ seconds after the occurrence of the short circuit. When the short circuit occurs, the flow of energy from the substation 3 causes the relay 10 adjacent the same to be so actuated as to permit its relay 9 to be actuated in one second. Thus, since the relays 9, under consideration, require a less time to operate than the relays 9 of the station 1 whose relays 10 are functioned properly, only the proper interconnectors will be cut out of circuit. Similarly, the times of operations of the relays 9 of the substations 4 and 5 will either be too high or the relays 10 will be so functioned as to preclude the operation of the same. As a result, sub-stations 1 and 2 will be supplied with power in one direction around the ring formation, and sub-stations 3, 4 and 5 will be supplied with power in the other direction.

Inasmuch as all the relays 9 and all the relays 10 are similar in construction and operation, with the exception of the adjustment of their definite time elements under overload conditions, it is deemed necessary to illustrate and describe completely only one group or set of relays 9 and 10, as shown in connection with the sub-station 3. In accordance therewith, the circuit breaker 12 is shown as being one means for connecting the sub-station 3 to the interconnectors 6 in the ring formation. The circuit breaker 12 is tripped by an electromagnetic device comprising a magnet winding 13, the circuit of which includes a battery 14 or some other suitable source of current, and a switch 14ª, which is dependent, for its operation, upon the operation of the relays 9 and 10. The relays 9 and 10 comprise three pairs of similar switches 15 and 16 that are disposed in parallel circuit and are employed to govern the operation of the switch 14ª which, in turn, closes the circuit through the magnet winding 13. One pair of the switches 15 and 16 is provided for each phase of the distributing system, and, since the circuit arrangements and the devices provided for each phase are substantially identical, they may be described only with reference to one of the phases. The switch 15 is operated by means of a device 17 which comprises a two-part magnetizable core, a core part 18 thereof being provided with a winding 19, the energizing current for which is proportional in amount to that traversing a conductor 20 of the interconnector 6 and is supplied by a series transformer 21. The core part 18 is also provided with a winding 22 that is connected in closed circuit with the winding 23 upon core part 24 of the instrument, a voltage being impressed upon the winding 23 which is proportional to that of the transmission lines 20, 25, 26 by means of a shunt transformer 27. The device 17 is actuated by the algebraic sum of two torques respectively proportional to the square of the current traversing the circuit and to the product of the current, voltage, and power factor of the circuit; in other words, an overload relay, so that the switch 15 will be closed against the action of a spring 28, when the amount of the load traversing the interconnector 6 or conductors 20, 25, 26 exceeds a predetermined value. The devices 17 are similar to the relay device disclosed in United States Patent No. 853,218, granted May 14, 1907, to the Westinghouse Electric and Manufacturing Company, except that the windings on the present relay devices 17 are so arranged that the principles set forth in United States Patent No. 933,746, granted September 14, 1909, to the Westinghouse Electric and Manufacturing Company, may be utilized.

The switch 16 is operated by means of a wattmeter device 28, which is constructed as set forth in U. S. Patent 853,218, current being supplied to a winding 29 thereof which is proportional in amount to that which traverses line conductor 20 by means of the series transformer 21, and to winding 30 thereof, which is proportional in amount to the voltage of one phase of the transmission-line conductors 20, 25 and 26 by means of the shunt transformer 27. The instrument serves to maintain the switch 16 open when energy traverses the transmission lines 20, 25 and 26 toward the substations, and to close the said switch when energy traverses the same in the reverse of this direction, that is, away from the substations, as indicated by the arrows. Thus, it is seen that both of the switches 15 and 16 are closed only when excess load traverses the transmission line so that the energy flow is away from the substations. When this occurs, the circuit of the magnet winding 31 is established and a time limit relay 32 is actuated. That is, the relays 10 may be closed under conditions of power flowing from the substations but unless the corresponding relays 9 are simultaneously actuated the interrupter will not be tripped.

When current flows through the winding 31, an electromagnet 33 is energized sufficiently to turn a receptacle 34 upon its support 35 and thus cause a conducting fluid 36 to flow from a compartment 37 through a port controlled by a needle valve 38 into a compartment 39. The needle valve 38 may be set for any predetermined definite time of operation, and, in this instance, when supplied in connection with the protective devices for sub-station 3, is set for one second, as hereinbefore mentioned. The conducting fluid 36 will pass through the port controlled by the needle valve 38 at such a rate that it will require a definite time interval of one second for it to reach terminals 40 and thereby close an auxiliary circuit 41 from a battery 42 through a magnetizing winding 43 of the switch 14ª. When switch 14ª is actuated, current flows through the magnetizing winding 13 of a circuit breaker 12, thereby disconnecting the interconnector 6 from the sub-station 3 at the end of a one-second time interval. The interconnector is disconnected near the sub-station 2 by means of protective devices 9 which are identical with the protective overload devices 9 shown in connection with the circuit breaker 12 but have a definite time element of 1½ seconds, as will be hereinafter explained.

While I have described, somewhat in detail, means for protecting electrical circuits, such means embodying the instruments 17 and 28 which, in turn, actuate the switches 15 and 16, I do not desire it to be understood that the broad aspects of this protective means are new in the art, the same being covered in my Patent No 977,648, granted December 6, 1910 and assigned to the Westinghouse Elec. & Manufacturing Company. Of course, it will be understood that, while certain devices are shown and described in performing the functions of the relays 9 and 10, many other devices may be used which will give satisfactory results.

While I have shown a separate definite time-limiting device 32 which acts in conjunction with the relays 17 and 28, it will be evident to those skilled in the art that the devices 17 may be so designed, with either a definite time-limit damping action or an inverse time-limit damping action, as to close the switches 15 after a predetermined length of time. In this instance, the closing of the tripping circuit through the magnetizing winding 13 will be under the direct control of the switches 15 and 16. If the device 18 is designed for an inverse time-limit action, it is important to prevent closing of the switches 15 under a certain minimum time limit on excess current flow.

Inasmuch as the sub-stations 1, 2, 3, 4 and 5 are protected by the relays 9 and 10 only, it is necessary to protect the power house 7 against such overloads as may occur. The protective devices usually employed, such as reverse relays and overload relays with definite time elements should have a time-setting greater than that of the maximum time-setting of the overload relays utilized in protecting the sub-stations which comprise the ring-type system of distribution. The time setting of the excess-energy, time-limit relays 9 protecting the station 7 is indicated as being two seconds.

While I have shown my system applied to a three-phase system of distribution, it will be apparent that it may be employed in connection with any system. Again, I have shown the time elements of the relays 9 and 10 as differing by increments of one-third of a second, which has proved to be satisfactory in practice, but it is obvious that other time increments may be employed, such as one-fourth of a second, one-half second, one second, etc.

It will be readily understood that many modifications other than those that have been illustrated and described, such as a plurality of net-work systems being arranged in turn in a ring-type system, may be made in my system without altering its mode of operation and without departing from the spirit of the invention, and I desire that all such modifications shall be included within its scope.

I claim as my invention:

1. In a system of power distribution, the combination with a plurality of sub-stations, interconnectors to connect said sub-stations in a ring-type formation, and means for supplying power thereto, of disconnecting devices inserted in the interconnectors and on each side of the sub-stations, and means for operating said disconnecting devices which comprises an excess-current definite time-limit actuating means, the time elements of corresponding actuating means which are associated with various sub-stations varying from one another by equal time increments from one side of the power-supplying means around the system to the other side of the power-supplying means.

2. In a system of distribution, the combination with a plurality of substations, interconnectors for connecting the substations in a ring type formation, and means for supplying power thereto, of disconnecting means inserted in the interconnectors and on each side of each of the substations, and operating means for actuating said disconnecting means associated with each substation in predetermined intervals of time after the occurrence of such overloads only as are represented by the excess flow of energy away from the substations, the intervals of time for the corresponding operating means that are associated with the various substations progressively varying from one another.

3. In a system of distribution, the combination with a plurality of substations, interconnectors for connecting the substations in a ring-type formation, and means for supplying power thereto, of disconnecting means inserted in the interconnectors and on each side of the substations, and means for operating said disconnecting means only a predetermined interval of time after an overload flows from the substations, the intervals of time for the corresponding operating means which are associated with the various substations progressively varying from one another.

4. In a system of distribution, the combination with a plurality of substations, interconnectors for connecting the substations in a ring-type formation, and means for supplying power thereto, of disconnecting means inserted in the interconnectors and on each side of the substations, and means for operating said disconnecting means only a predetermined interval of time after an overload flows from the substations, the intervals of time for the corresponding operating means which are associated with the various substations progressively varying from one another by equal time increments when advancing around said ring formation in both directions.

5. In a system of power distribution, the combination with a plurality of substations, interconnectors to connect said substations in a ring-type formation, and means for supplying power thereto, of circuit breakers inserted in the interconnectors and on each side of each substation, independent actuating means for the circuit breakers, and definite time-element devices to operate said actuating means when excess energy flows from the respective substations for more than a predetermined length of time, the time elements of correspondingly-disposed devices progressively varying from one another when advancing around said ring formation in a given direction.

6. In a system of power distribution, the combination with a plurality of substations, interconnectors for connecting said substations in a ring-type formation, and means for supplying power thereto, of circuit breakers inserted in interconnectors and on each side of each substation, independent actuating means for the circuit breakers, and excess-current definite time-element devices to operate said actuating means when excess-energy flows away from the respective substations for more than a predetermined length of time, the time elements of correspondingly disposed devices progressively varying from one another by equal time increments when advancing around said ring formation in either direction.

7. In a system of power distribution, the combination with a plurality of substations, interconnectors for connecting said substations in a ring-type formation, and means for supplying power thereto, of disconnecting devices inserted in the interconnections and on each side of the substations, and excess-energy definite time-limit actuating means for actuating the disconnecting devices, the time elements of the actuating means on one side of the substations varying progressively from the power-supplying means in one direction and the time elements of the actuating means on the other side of the substations varying progressively from the power-supplying means in the other direction.

8. In a system of power distribution, the combination with a plurality of substations, interconnectors for connecting said substations in a ring-type formation, and means for supplying power thereto, of disconnecting devices inserted in the interconnectors and on each side of the substations, and excess-energy definite time-limit actuating means for actuating the disconnecting devices, the time elements of the actuating means on one side of the substations increasing from one side of the power-supplying means to the other side of the power-supplying means and the time elements of the actuating means on the other sides of the substations increasing from the other side of the power-supplying means.

In testimony whereof, I have hereunto subscribed my name this 28th day of Nov. 1914.

PAUL MacGAHAN.

Witnesses:
   HAROLD B. TAYLOR,
   B. B. HINES.